(No Model.) 5 Sheets—Sheet 1.

T. PINK.
CASH RECORDER AND CHECK PRINTER.

No. 499,309. Patented June 13, 1893.

Witnesses.
G. F. Redfern
John E. Bousfield.

Inventor
Thomas Pink (No Model.) 5 Sheets—Sheet 4.
T. PINK.
CASH RECORDER AND CHECK PRINTER.
No. 499,309. Patented June 13, 1893.
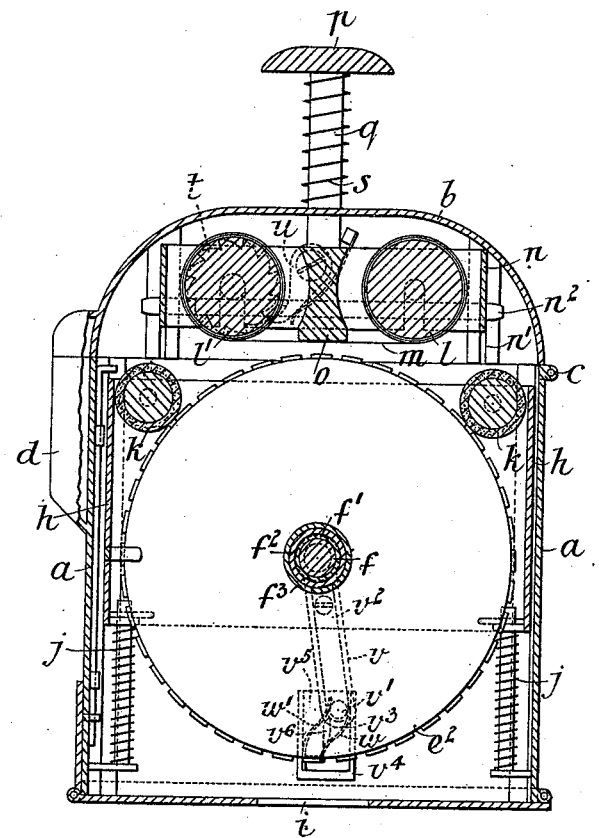

(No Model.)  5 Sheets—Sheet 5.

T. PINK.
CASH RECORDER AND CHECK PRINTER.

No. 499,309. Patented June 13, 1893.

Witnesses.
Wm Burnet.
Alx Scott

Inventor.
Thomas Pink.
By John J. Halsted & Son his Attys

UNITED STATES PATENT OFFICE.

THOMAS PINK, OF LONDON, ENGLAND.

CASH-RECORDER AND CHECK-PRINTER.

SPECIFICATION forming part of Letters Patent No. 499,309, dated June 13, 1893.

Application filed January 8, 1891. Serial No. 377,095. (No model.)

*To all whom it may concern:*

Be it known that I, THOMAS PINK, a subject of the Queen of Great Britain, residing at London, England, have invented a new and useful Apparatus for Acknowledging and Recording Payments, of which the following is a specification.

My invention relates to a new kind of stamp or apparatus specially designed for use by account collectors, shop assistants and others for giving printed receipts for moneys received, and at the same time keeping a printed record of such receipts.

My apparatus is advantageously made in the form of a stamp, in connection with the impression portion of which are arranged disks provided with figures and hereinafter referred to as type-disks. Upon the shafts of these type-disks (which shafts are arranged one within the other) is a second series of disks hereinafter referred to as setting disks, which setting disks are marked on their peripheries to correspond with the type-disks with which they are respectively connected, whereby at the same time that any combination of figures is being made by the operator by the setting disks, the corresponding figures upon the type-disks are set in position to print. In conjunction with the type-disks is arranged a ribbon or tape of paper upon which the said type-disks are adapted to print, the same movement which produces an impression upon an account or bill to be receipted serving to produce a corresponding impression upon the ribbon or tape. The same movement is also preferably utilized for feeding the paper ribbon or tape forward through the medium of ratchet and pawl or other suitable mechanism.

To enable my invention to be fully understood I will describe the same with reference to the accompanying drawings, in which—

Figure 1:
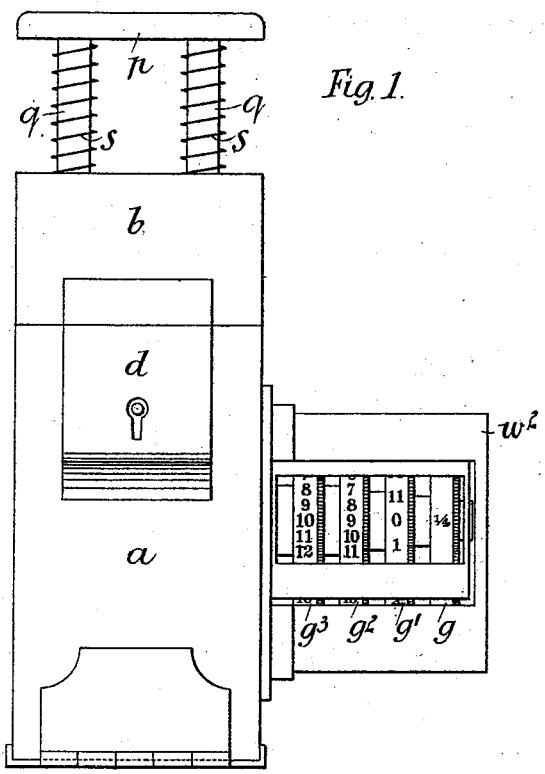
Figure 2:
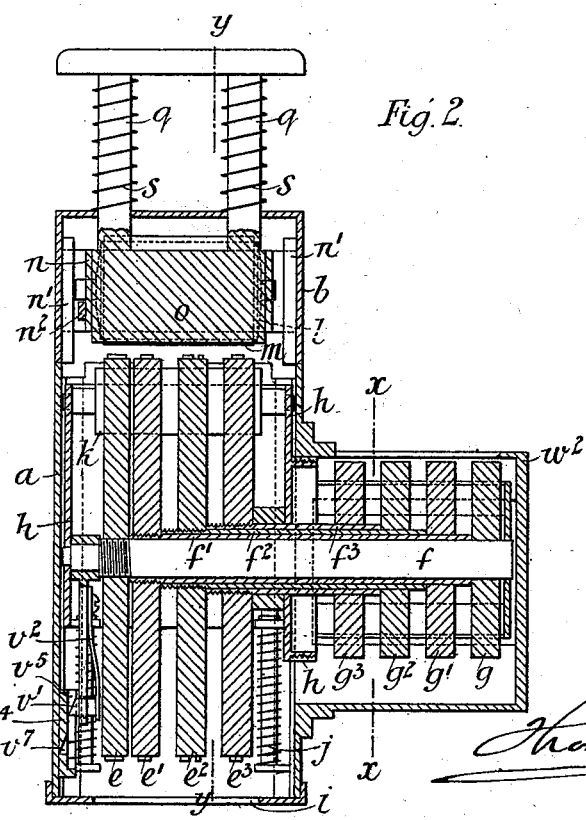
Figure 3:
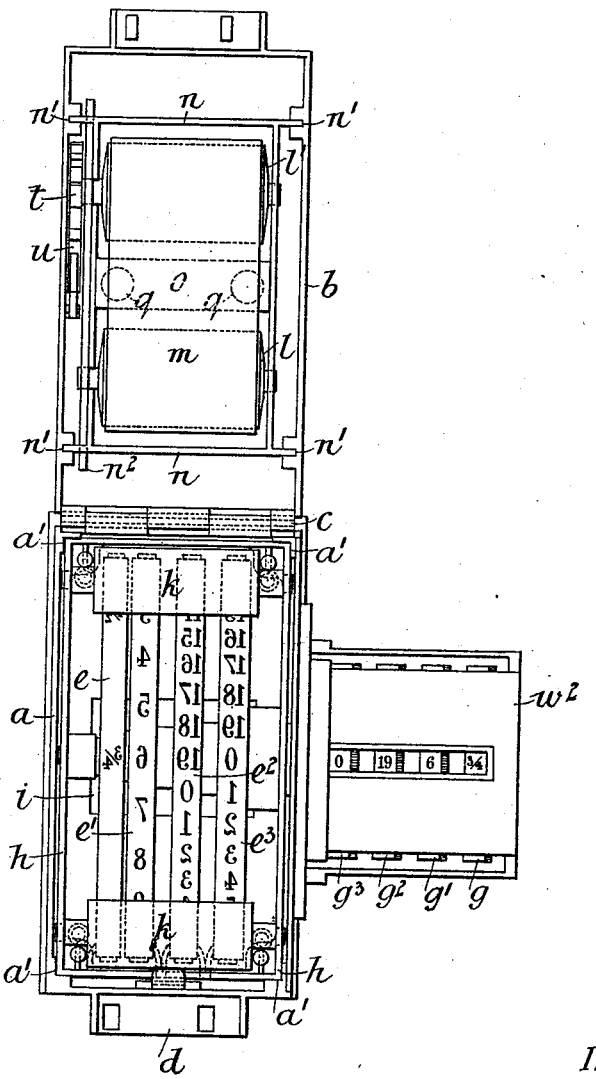
Figure 4:
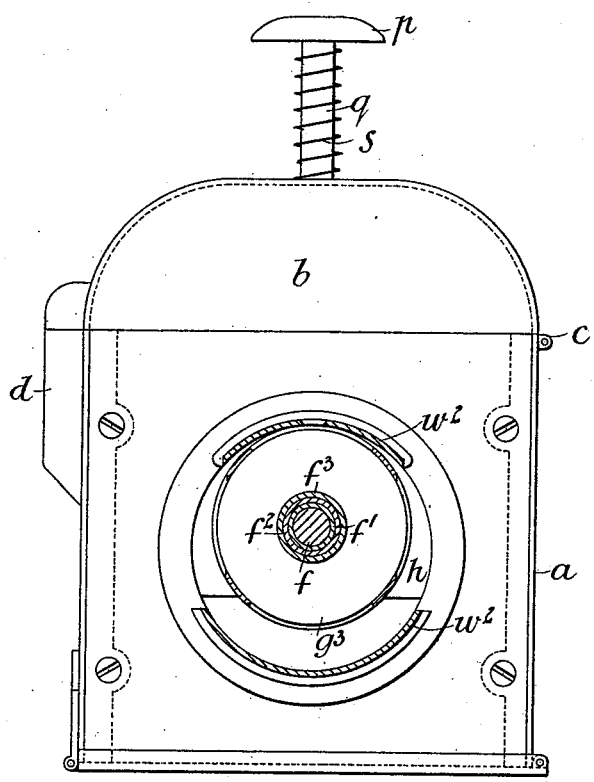
Figure 10:
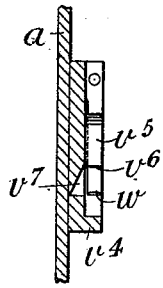
Figure 9:
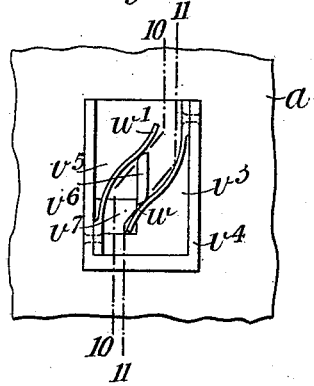
Figure 11:
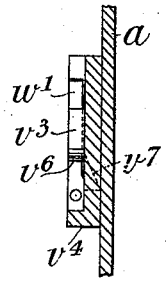
Figure 12:
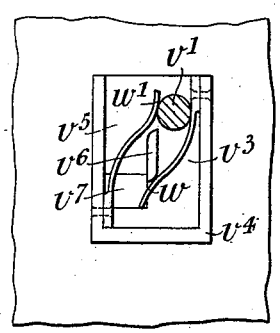
Figure 13:
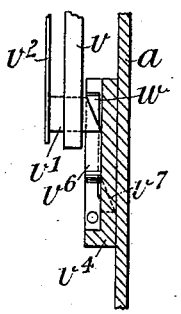
Figure 14:
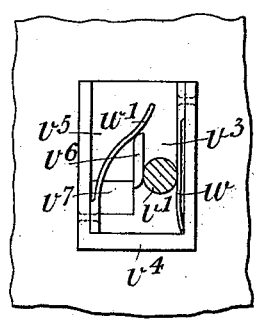
Figure 15:
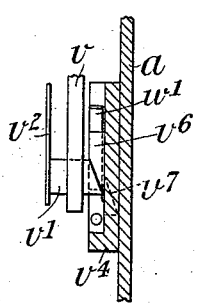
Figure 16:
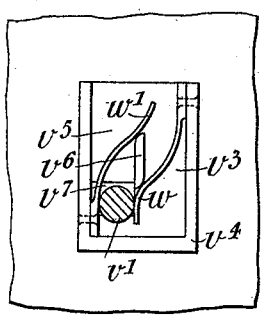
Figure 17:
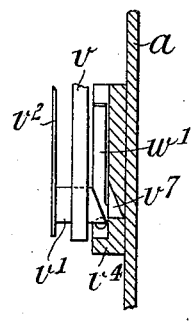
Figure 18:
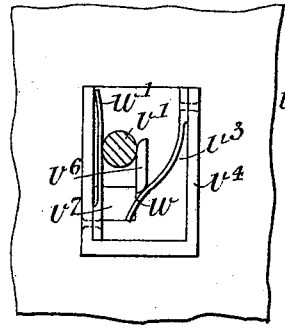
Figure 19:
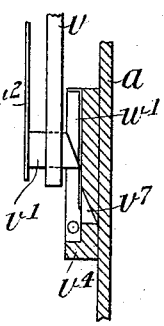

Figure 1 is a front elevation of my improved apparatus, and Fig. 2 is a vertical section thereof. Fig. 3 is a plan of the apparatus, the upper part of the casing being thrown back in order to reveal the mechanism. Fig. 4 is a section on the line $x\, x$ Fig. 2, and Fig. 5 is a section on the line $y\, y$ Fig. 2. Fig. 6 is a view of a detail, and Figs. 7 and 8 are sectional views of the same on the lines $z\, z$ and $z'\, z'$ respectively. Fig. 9. is a similar view to Fig. 6, drawn to an enlarged scale. Figs. 10 and 11. are sections respectively on the lines 10. 10. and 11. 11. of Fig. 9. Figs. 12 and 13. are similar views to Figs. 9 and 11. respectively, showing the normal position of the pin $v'$. Figs. 14 and 15, Figs. 16 and 17, and Figs. 18 and 19, are respectively similar views to Figs. 12 and 13, showing different positions of the pin $v'$ in its cycle of movement.

$a$ is the case of the apparatus, the upper part or cover $b$ of which is hinged thereto at $c$, and provided with a lock $d$ or other suitable means for securing it.

$e$, $e'$, $e^2$, $e^3$ are the type-disks having upon their peripheries the necessary figures, as shown, the disk $e$ which is for farthings has $\frac{1}{4}$, $\frac{1}{2}$ and $\frac{3}{4}$ upon it, the disk $e'$ for pence the numbers 1 to 11, the disk $e^2$ for shillings the numbers 1 to 19, and the disk $e^3$ for pounds also the numbers 1 to 19. Each disk, except the disk $e$ which has a blank space instead, has also a cipher so that any amount from one-fourth pence to nineteen pounds, nineteen shillings, eleven and three-fourth pence can be arranged in position for printing. The type-disks are severally provided with duplicate sets of figures, arranged in such positions that corresponding figures are diametrically opposite to each other.

$f$, $f'$, $f^2$, $f^3$ are the shafts upon which the said type-disks are respectively mounted and which fit one within the other, as shown most clearly in Fig. 2; and $g$, $g'$, $g^2$, $g^3$ are the setting disks also mounted on the shafts $f$, $f'$, $f^2$, $f^3$ respectively outside the case $a$, the said setting disks being numbered to correspond with the type-disks with which they are respectively connected, so that by adjusting the said setting disks $g$, $g'$, $g^2$, $g^3$ the corresponding figures on the type-disks $e$, $e'$, $e^2$, $e^3$ will be placed in position for printing the required amount. For instance, as shown in Fig. 3, the type-disks are represented as being adjusted to print the amount 0£, 19s., 6¾d., which amount is to be printed simultaneously by opposite sides of the type-disks as hereinafter described.

The type-disks $e$, $e'$, $e^2$, $e^3$ with their shafts $f$, $f'$, $f^2$ and $f^3$ and the corresponding setting disks $g$, $g'$, $g^2$, $g^3$ are mounted in a frame $h$ sliding in guides $a'$ within the case $a$ so that the said type-disks can be depressed in order to cause the figures upon their lowest parts to protrude through an opening $i$ in the bottom of the case $a$ and impress the paper or the like upon which the apparatus is placed.

$j, j$ are springs which serve to raise the type-disks and their connected parts when the printing is accomplished.

$k, k$ are small rollers of felt or other material also carried in the frame $h$ and serving to ink the figures upon the peripheries of the type-disks.

$l, l'$ are two rollers upon which the ribbon or tape of paper $m$ (upon which the record of the amount paid is to be printed) is wound. These two rollers are mounted in a frame $n$ sliding in guides $n', n'$ in the cover $b$, the said rollers being held in their bearings by means of a pin or key $n^2$, the removal of which permits the said rollers to be taken out of their frame to enable the ribbon or tape of paper to be taken out and another substituted.

$o$ is an impression block over which the ribbon $m$ of paper passes and which is designed to press upon the uppermost type upon the type-disks when the frame $n$ is depressed.

$p$ is a handle or cross-bar secured to the upper ends of two rods $q, q$, the lower ends of which are connected to the block $o$ in such a manner that, when the said handle or cross-bar $p$ is depressed, the frame $n$ together with the rollers carried thereby will be moved downward so as to bring the paper ribbon $m$ into contact with the type, the continued downward pressure then causing the depression of the type-disks so as to print upon the paper or other material placed beneath the apparatus.

$s, s$ are springs surrounding the rods $q, q$ and serving to lift the frame $n$ and the parts carried thereby when the pressure on the handle $p$ is relieved, the spring $j, j$ serving as hereinbefore described to lift the frame carrying the type-disks.

In order that the ribbon or tape of paper upon which the record is printed shall be moved after each printing operation, so as to bring a fresh part of the paper ready for the next printing, the roller $l'$ is provided on one end with a ratchet-wheel $t$, and on the cover $b$ is a spring-pawl $u$ which is so arranged that when the frame is depressed, the pawl will slip over the teeth, but which as the frame again rises will engage with the said ratchet-wheel $t$, so as to rotate the same the required extent to move the paper ribbon forward.

I advantageously provide means for preventing two receipts from being given for the same amount without operating the record tape. As shown in the drawings, I have mounted on the end of the shaft $f$ an arm $v$ having on its free end a pin $v'$ acted upon by a spring $v^2$. This pin is adapted when the type-disks are depressed, to slide down a groove $v^3$ in a frame $v^4$ and when the type-disks rise, to slide upward through a groove $v^5$ in the said frame. When two grooves $v^3$, $v^5$ are separated by a partition $v^6$, and in the grooves $v^3, v^5$ I provide springs $w, w'$ respectively, the former of which, when the pin $v'$ has passed below the bottom of the partition $v^6$, presses upon the pin and pushes it into the groove $v^5$ while the latter, as the said pin is moving upward in the groove $v^5$, serves to return the pin to the groove $v^3$ after it has passed above the top of the partition $v^6$. As the pin is transferred from the groove $v^3$ into the groove $v^5$, (this only taking place when the type of the type-disks are actually upon the paper to be printed) its end is slightly below a notch $v^7$ in the said groove $v^5$, this notch being about horizontal at its base line, and inclining thence outward, as shown in Fig. 7 when however, the slightest upward movement is allowed to the type-disks, the pin $v'$ enters the said notch and its horizontal base line serves also to check and arrest another downward movement at this stage, and thereby prevents the said disks from being again depressed, until the frame carrying them and the paper rollers, have moved upward to their proper extent to allow of the movement of the paper ribbon, and the pin $v'$ to again enter the groove $v^3$.

$w^2$ is a case surrounding the setting disks $g, g', g^2, g^3$, which case is provided at the top with an opening behind which are arranged the figures on the said disks of the amount it is desired to print. The case $w^2$ is also provided with openings at the sides for permitting the operation of the said setting disks and is made of sufficient depth, as shown most clearly in Fig. 2, to permit of the free downward movement of the said disks.

Having now particularly described and ascertained the nature of my said invention and in what manner the same is to be performed, I declare that what I claim is—

1. In combination, a set of type disks mounted in a case having an opening in its bottom, a tape or ribbon, and a pusher sliding in right lines by guide ways, and serving first to push the ribbon against the type and afterward to further sliding it downward, to push the type-disks against the paper located beneath such bottom opening and outside of the case, all substantially as set forth.

2. In combination with the pusher and its re-acting springs, and with the vertically-moving printing disks and their re-acting springs, the arm $v$, its pin $v'$ and spring $v^2$, partition $v^6$, grooves $v^3, v^5$ and their springs $w, w^2$, and notch $v^7$, all substantially as and for the purpose set forth.

3. In a payment-acknowledging and recording apparatus having type disks within a case and carried by a vertically-movable frame or guide, a vertically movable pusher serving first to push a suitably-supported paper (to be printed inside the case), against the type, and subsequently to push the disk-holder and its disks still farther down to print upon a paper outside of and beneath the case.

4. In a case having an opening in its bottom, the combination therewith of a sliding re-acting pusher working by guide-rods in right lines, vertically movable printing disks severally mounted on one of a set of concentric shafts, and a tape-feeding mechanism actuated by the re-action of upward movement of the pusher,—such pusher in its downward movement serving first to print the record within the case, and afterward upon its further downward movement, to print the receipt upon the paper outside the case.

5. In combination, the case adapted to stand upon a table, having an opening $i$, at its bottom, the series of printing disks vertically movable with their supporting frame to carry the disks to such opening, the impression block $o$, pusher $p$, and its sliding guide rods and springs, and mechanism, substantially as described, serving to print the tape within the case by the agency of the pusher, next to print the outside ticket by a further downward sliding of the pusher, and finally to feed the tape by the automatic return of the pusher to its normal position.

THOMAS PINK.

Witnesses:
JOHN E. BOUSFIELD,
*Of the firm of G. F. Redfern & Co., 4 South Street, Finsbury, London, Patent Agents.*
W. C. BROKENSHIRE.